United States Patent Office 2,864,715
Patented Dec. 16, 1958

2,864,715

METHODS OF MAKING A LIGNOCELLULOSE PRODUCT AND PRODUCTS RESULTING THEREFROM

William T. Glab, Dubuque, Iowa, assignor to Carr, Adams & Collier Company, a corporation of Iowa No Drawing. Application July 15, 1954
Serial No. 443,711

13 Claims. (Cl. 106—163)

This invention relates to methods of making a lignocellulose product and to the products resulting therefrom.

It is an object of this invention to provide an improved method of making a moldable composition comprising reacting an essentially dry mixture including comminuted lignocellulose and a reactant capable of splitting at least a portion of the lignin from the lignocellulose while confining the mixture of lignocellulose and reactant under superatmospheric pressure.

Another object of this invention is to provide such a method wherein the reactant is either steam, sulfur, ammonium hydroxide, sulfur dioxide, hydrogen sulfide, lime, formaldehyde, acetylene, dibasic ammonium phosphate, by-product lignin, and combinations of these, preferably steam, sulfur and ammonium hydroxide or sulfur dioxide, steam, sulfur, formaldehyde and ammonium hydroxide or sulfur dioxide, steam and sulfur, as well as others.

Another object of this invention is to provide such a method wherein the reaction is conducted in an atmosphere of steam at about 300–550° F. for about 4–60 minutes.

Another object of the invention is to provide an improved method of making a molded composition comprising reacting an essentially dry mixture including comminuted lignocellulose and a reactant capable of splitting at least a portion of the lignin from the lignocellulose while confining the mixture under superatmospheric pressure, finely dividing the resulting product and molding at an elevated temperature and pressure.

A further object of the invention is to provide a method as set out herein where the molding pressure is about 25–10,000 pounds per square inch while the temperature is about 250–400° F. and the molding time is from about 0.1 to 15 minutes.

A further object of the invention is to provide lignocellulose products prepared by the above methods.

Other objects and advantages of the invention will be apparent from the following description of several embodiments of the invention.

An important advantage of the invention appears to be the controlling of the reaction so that the alpha cellulose is reduced in molecular size sufficiently to prevent swelling of subsequently fabricated products but not to the extent that toughness of fibre is lost. This latter occurs under drastic degradation and starts to become quite serious when approximately 25% of the lignocellulose has been lost as either gaseous or soluble by-products. Another advantage appears to be the controlling of the cellulose degradation to plasticize the lignin component so that it can subsequently be made to flow and function as a binder between the comminuted lignocellulose particles.

Another advantage is the provision of a relatively dry system so that high capacity for the processing of, for example, wood waste is attained. This is not possible in a wet process such as ordinarily found in a pulping process in which the reactor is charged with approximately 90% water which takes up space as well as requires the addition of large amounts of energy to bring the reaction medium to the proper temperature.

Another advantage is the contacting of lignocellulose or dry mixes of lignocellulose and other ingredients under superatmospheric pressure with a vapor or combination of vapors functioning both as a heat transfer medium and as a reactant.

A further advantage is the production of an extrudable composition wherein the reaction products may be extruded under a pressure of 2,000–20,000 lbs. per square inch and in a temperature range of 100–400° F. to produce shaped articles.

In the method of this invention an essentially dry mixture including comminuted lignocellulose and a reactant capable of breaking down at least a portion of the lignocellulose to provide lignin or modified lignin is reacted as by heating while confining the lignocellulose and the reactant under superatmospheric pressure as in an autoclave. During the reaction the lignocellulose bond is apparently broken and the lignin is released to operate as a binder.

It appears that the hemi-celluloses are the primary constituents of the lignocellulose which are attacked by hydrolysis, but that under the high pressure and temperature of this invention a portion of the hydrolysates are further converted to higher molecular weight materials which can function as plasticizers for the autoclave product when it is molded. At the same time a controlled degradation of the alpha cellulose is carried out to the extent that the desired degree of moisture stability is obtained in the molded or extruded products without an unnecessary loss of toughness. These actions are believed to occur although they have not been absolutely proven.

The methods of this invention may be carried out batchwise in an autoclave or a sealed press or continuously in a continuous contactor.

The lignocellulose which appears dry to the touch actually contains up to about 30% water before the reaction begins.

The lignocellulose which may be used in this invention includes wood as well as other lignocellulosic vegetable materials. The lignocellulose is finely divided so that the particles are preferably not more than 20 mesh in size as measured by a standard screen although smaller sizes are preferred.

During the reaction which takes place in a confined atmosphere under superatmospheric pressure various reaction products are produced although the exact nature of the reactions is not understood. It appears that the reaction products are either inert so that the product itself is inert, have a binding action such as is true of the lignin produced, are gaseous by-products, or are polymerized. By hydrolyzing and partially removing; or polymerizing the hemicelluloses to lignin type materials, the ratio of lignin and other binders to the alphacellulose is increased so that the general nature of the lignocellulose mixture is drastically changed.

The high pressure method of this invention has a number of advantages that are not possible with reactions taking place at ordinary pressures and in an unconfined state. In the preferred process, steam is introduced into the autoclave both for heating purposes and to supply moisture for the reaction. In the high pressure method of this invention heat transfer is much more rapid so that in general a shorter reaction time is required. Furthermore, energy losses during the reaction are greatly reduced. In the ordinary reacting mixture these energy losses result from the release of volatile materials such as water vapor, gaseous reaction by-products and the like. As the reaction here takes place in a confined atmosphere, no such losses occur to any material degree. Furthermore, the energy supplied by the steam or vapor is utilized to heat only the lignocellulose with it approximately normal moisture content in contrast to pulping type reactions where large quantities of water are present, requiring far greater expenditures of energy.

Another important advantage of this process is the close control that is obtained over the reaction. Thus the temperature of the reacting mass, and hence the rate of reaction, can be easily raised or lowered by controlling the rate of flow, pressure and the temperature of the heat transfer medium which may be steam, oil vapor, or other high temperature fluids. Reactions may easily be stopped by flashing the heat transfer medium from the autoclave since the large energy loss on expansion cools the reacting mass below the incipient reaction point. During the practice of the process the reacting mixture may be confined in a jacketed vessel with the heating medium introduced to the chambers in the quantity and temperature desired.

A very important advantage of the invention is that volatile reactants may be used as the reacting mass is in a confined space. Volatile reactants are impossible, of course, when the reacting mass is in the open. As a result of the rapid heat transfer achieved by this invention and the penetration of volatile reactants the reaction not only proceeds to completion in a much shorter time but the final product tends to be more uniform than where the reactants are heated such as in an ordinary process that depends upon surface temperature differentials.

Tests have shown that the confining of the reacting mass in the confined autoclave not only causes retention of the by-products of reaction within the mass even when the by-products are gaseous but also causes polymerization of all or a portion of these by-products, even some that are gaseous. In so-called wet processes large quantities of the by-products of reaction go into solution and are lost. When the reactant is sulfur it has been definitely shown that some of the by-products can polymerize to higher molecular weight materials during the reaction.

Another advantage of the invention is that the volatile by-products are easily collected and removed at low cost for later use where desired or to prevent the creation of a nuisance.

Where the reactants and catalysts for the reaction are volatile no mechanical mixing of the ingredients is required. This results in a considerable saving in time, labor and other factors. Thus, in these instances, it is only necessary to charge the reactor with the lignocellulose and introduce the volatile materials into the reactor under superatmospheric pressure. In addition, if desired, the reactants can be changed or modified during the course of a run. This is not possible to such a degree in a wet process where the charge generally contains less than 50% of lignocellulose, and addition of reactants would in many cases cause prohibitive amounts to go into solution.

A further advantage of utilizing a vapor process is that the volatile content of the reaction product which is primarily moisture can be controlled. By using superheated steam with a sufficient degree of superheat, products on the order of 1% or lower volatile content can be obtained. Under normal conditions, 10 to 15 degrees of superheat at 300 pounds per square inch steam pressure will produce a product of 3–5% volatile content. Thus the expensive drying step connected with wet processes can be avoided.

Because of rapid penetration of reactants under high pressure, larger sized particles can be charged to the autoclave than would ordinarily be used, and a savings in size reduction cost made as a result of lower power requirements to reduce the treated material in comparison with raw lignocellulose.

In addition, where flat stock or preformed material is being made as in a sealed press, the products can be made much thicker and more uniform than in an ordinary press which depends upon high platen temperatures for heat transfer, and in many cases requires almost prohibitive cycle times.

The preferred reactants have been found to be either steam, sulfur, ammonia, dibasic ammonium phosphate, dibasic ammonium phosphate plus lignin, formaldehyde, sulfur dioxide and hydrogen sulfide. As can be seen, many of these are gaseous either at normal or elevated temperatures.

It has been found that combinations of the above ingredients are often advantageous to produce a desired result. Thus, it has been proved that weight losses can be minimized by using ammonia to maintain an alkaline medium where steam and sulfur are used. In general, losses are reduced in the presence of an alkali medium. There are, however, specific instances where an acidic medium such as sulfur dioxide is required to increase the rate of reaction or to catalyze a reaction as is the case where lignocellulose is reacted with steam and formaldehyde. Where an acidic medium is employed, shorter cycle times can be used to obtain a product with the same weight loss as that in a neutral or alkaline medium. Thus to produce desired results, ammonium hydroxide has been used successfully with combinations of steam, steam and formaldehyde, and steam, sulfur and formaldehyde while sulfur dioxide has been used with steam, steam and formaldehyde, steam, sulfur and formaldehyde, steam and acetylene, and steam with sulfur.

Where the reactant is steam, this steam is preferably supplied to the autoclave or other confined reactor at a temperature of 300–550° F. and the reaction is permitted to proceed for from 4–60 minutes. In general, the longer periods of time are used with the lower temperatures while shorter periods are required with higher temperatures.

The steam may be saturated or superheated and may be at a pressure of between 200–1,000 pounds per square inch gauge. In the preferred process, the temperature of the steam is between 425–500° F. and the steam is superheated.

Where sulfur is the reactant in conjunction with the steam, the sulfur is preferably finely divided to a particle size that is preferably no more than 100 mesh on a standard screen. An especially preferred range of particle size is between 200–300 mesh. In the preferred process the sulfur is used in an amount between 0.5–20.0% by weight of the lignocellulose. The reaction time and the reaction temperature is about the same as that given above in connection with steam alone as the reactant.

Where the reactant is a mixture of sulfur and ammonium hydroxide, the sulfur is preferably present in an amount as given above. The ammonium hydroxide is preferably present as a 26° Bé. solution in water containing from 27–30% ammonia, but anhydrous ammonia in the gas phase could be introduced into the autoclave. The ammonium hydroxide is preferably used in an amount between 2.5–10.0% by weight of the lignocellulose. The reaction temperature and times are preferably substantially the same as those given above in connection with steam.

Where the reactant is a mixture of sulfur and lime, the sulfur is preferably used in about the same amount as given above, the lime is preferably in an amount between 2.5–10.0% by weight of the lignocellulose. The reaction temperatures and times are substantially the same as those given above in connection with steam.

The products of the reactions of this invention may be finished shaped materials, moldable compositions that may be used to make molded products either by injection method or by batch molding or extrudable compositions. The injection method may be used as the material will flow when heated. Where the product is molded after the reaction, this product is preferably removed from the reaction vessel and then ground to a fine powder that is preferably not over 50 mesh in size. The finely divided moldable material is heated to a temperature just sufficient to cause the material to flow and fill the mold under the pressure used. This temperature is kept sufficiently low, however, that losses are minor and breakdown due to decomposition is kept to a minimum. The preferred temperature is between 250–400° F.; however, with special plasticizers the material can be molded at room temperature.

The molding pressure may be any pressure sufficient to cause the material to fill completely the mold and will vary depending upon the shape of the mold, the nature of the moldable material and other factors. In the preferred process to produce high density materials this pressure is between 2,000–10,000 pounds per square inch. The molding time is only sufficient to cause the moldable material to fill the mold and set, and again will vary depending upon the type of mold being used, the temperature, the nature of the moldable material and similar factors. In general, the molding time will vary between 0.2–15 minutes.

The flow of the moldable material of this invention is improved and a shorter time is required if a plasticizer is added. Thus, by adding 10% aniline to the finely divided moldable composition of this process where the reactant was sulfur, the flow time at 5,000 pounds per square inch was reduced from about 4–5 minutes to 0.5 minute. Similarly, by adding 10% furfural to the same type of moldable composition, the molding time was reduced to less than one minute.

Plasticizers in general which have been found to be effective with the moldable materials include water; aromatic compounds containing a hydroxyl group such as aniline, phenol and cresol; alcohols such as benzyl, diethyleneglycol, glycerol, and furfuryl; nitrogen compounds such as formamide, urea, pyridine, and triethanolamine; and furfural.

The preferred plasticizers are water, furfural, aniline and phenol and the quantity utilized may vary depending on the flow desired. The preferred quantity is between about 2–20%.

In particular, the choice of plasticizer will depend upon the end use or method of fabrication of the material. The reaction products themselves are of a slow thermosetting nature. Thus, if a plasticizer such as water which is incapable of thermoset is used, the material is essentially of a thermoplastic nature. This is also true of the preferred plasticizers as a group; however, when desired, thermoset compositions can be made by using furfural, aniline or phenol in conjunction with a catalyst and, if desired, other materials capable of copolymerization.

Materials which will function as catalysts include the oxides, hydroxides and carbonates of the alkali and alkaline earth metals. The preferred catalysts are the oxides of calcium and magnesium.

Among the materials which may be used with the thermosetting plasticizers as copolymers are hexamethylene tetramine, dimethylolurea, paraformaldehyde and urea.

Depending upon the set time required, about 0.5–5.0% of the catalyst and about 0.5–10% of the copolymer are used.

If desired, thermoset products can be obtained without the use of catalysts or copolymers merely by heat treating the fabricated products after they have been molded or extruded.

If desired, products of density ranging from 0.2–1.3 specific gravity may be produced in the high pressure reacting vessel itself without requiring a subsequent molding operation as described above with high pressure molding. Here the finely divided lignocellulose and the reactant are mixed where the reactant is a solid or liquid and the mixture cold pressed into the desired shape or compacted in a sealed press. The compressed mixture is then heated in the press or other high pressure vessel for the required time at the required temperature and pressure. The material when removed from the reaction vessel will then be found to be quite hard and strong. In these instances, the reactant may be any of those set out above. Excellent reactants have been found to be sulfur and steam, dibasic ammonium phosphate, a mixture of dibasic ammonium phosphate and lignin, formaldehyde plus sulfur dioxide and sulfur plus formaldehyde in an atmosphere of sulfur dioxide.

When the reactant is to be ammonium phosphate, the preferred amount varies between 2–4% by weight of the lignocellulose. When lignin is also used, the preferred amount of dibasic ammonium phosphate is between 2–4% and the amount of lignin is between 4–8% by weight of the lignocellulose. Where the reactants are gaseous such as the mixture of formaldehyde and sulfur dioxide, they may easily be introduced into the reacting vessel under superatmospheric pressure. If desired, of course, the formaldehyde may be mixed in with the lignocellulose as a liquid and the sulfur dioxide introduced as a gas under pressure. In the other alternative, sulfur is mixed in the lignocellulose in about the same amounts as set out above, formaldehyde is added to the mixture and the atmosphere of sulfur dioxide is introduced into the reacting vessel under pressure.

In the latter described methods, steam may or may not be supplied to the reaction vessel depending upon the result desired. If steam is used, it is preferably supplied at 100–1000 pounds per square inch pressure and at a temperature of 400–550° F. In the event that a sealed press is used, the normal moisture content of the wood as well as the reaction by-products may be used to build up to a predetermined pressure which can be maintained constant by venting the excess vapors produced. This pressure is preferably between 100–600 pounds per square inch. Such a procedure eliminates the blow-ups encountered in treating wood in an ordinary hot press at high temperatures, as well as drastically reducing press time, and polymerizes a percentage of the gaseous and low molecular weight by-products to resinous-like materials which function as binders for lignocellulose particles. If desired, a two step process may be used in which the first step includes the pressure treatment and the second step includes venting the vapors to atmospheric pressure followed by a 2–10 minute heat treatment period before removing the material from the press or the autoclave.

EXAMPLE 1

Finely divided lignocellulose, containing only its normal moisture content of approximately 6%, was mixed with 9% by weight of finely divided sulfur of 300 mesh size. The mixture was placed in a heated autoclave, and steam was admitted until the pressure was 300 pounds per square inch and the temperature was 425° F. The mixture was held under these conditions for 10 minutes, and then the steam was rapidly flashed off. The reacting mixture was removed from the autoclave and all particles which had consolidated were thoroughly broken up. The moisture or volatile content of this product was approximately 5%, and the weight loss based on the wood content was approximately 12.5%. The material was then molded into a disc by heating it in a mold at 300° F. and a pressure of 5,550 pounds per square inch for about 10 minutes. The resulting molding was black in color, very strong and on immersion in water for 24 hours gained only 1.93% in weight, and increased 1.61% in thickness.

EXAMPLE 2

A mixture of finely divided lignocellulose and sulfur of the type as set out in Example 1 was cold pressed into a perforated mold whose ends were confined to prevent springback of the compressed mixture. The container was placed in the autoclave, and again steam was admitted to a pressure of 300 pounds per square inch and a temperature of approximately 425° F. The preformed material was held in the autoclave for 15 minutes before the steam was flashed out. Upon removal from the autoclave, it was found that the mixture had consolidated into a strong tough mass about 2 inches thick of relatively light weight, approximately 35 pounds per cubic foot. The surface of this material was then densified by placing a piece of it between the platens of a hot press under 50 pounds per square inch pressure and 350° F. for one minute.

EXAMPLE 3

To a mix of lignocellulose and sulfur, as specified in Example 1, 15% of a 30% aqueous ammonium hydroxide solution was added and the resulting mixture was thoroughly agitated. It was then placed in the autoclave under 300 pounds per square inch steam pressure and 435° F., and held there for 20 minutes. Upon removal from an autoclave, the product had a volatile content of 13.2% and had a weight loss of approximately 12% based on the wood. The natural moisture content of the lignocellulose used was 8.5%. The product of this reaction was then molded under different conditions to produce materials of widely varying densities. When molded for 15 minutes at 450° F. and under a pressure of 50 pounds per square inch, a 36 pound per cubic foot product was obtained. When molded for 3 minutes at 360° F. under a pressure of 5000 pounds per square inch the product had a density of 82 pounds per cubic foot. The moisture resistance of both these materials was quite good. On 24 hour immersion the following results were obtained:

| Density | Percent Wt. Increase | Percent Thickness Increase |
|---|---|---|
| 36 lbs. per cu. ft. | 71.5 | 1.72 |
| 82 lbs. per cu. ft. | 1.34 | 0.48 |

Both materials appeared strong and tough, and when tested in flexure, the 82 pounds per cubic foot molding had a modulus of rupture of 6,500 pounds per square inch.

In addition, some of the autoclave product of this reaction was placed in a small extrusion apparatus heated to 350° F., and extruded into a tough dense rod under a pressure of 12,000 pounds per square inch.

EXAMPLE 4

Plain lignocellulose was placed in the autoclave and subjected to steam at 300 pounds per square inch and 425° F. for 30 minutes. Upon removal from the autoclave, the lignocellulose was found to have a volatile content of 7.45% and a weight loss of 14.65%. This material was then oven dried to zero volatile content and molded for 5 minutes at 370° F. under a pressure of 5,550 pounds per square inch. The molding was dark brown in color, and when subjected to a one hour boil test had an increase in thickness of only 4.8%. It exhibited a modulus of rupture of 5,010 pounds per square inch when tested in flexure.

When this autoclave product was molded at 450° F. for 8 minutes at a pressure of 50 pounds per square inch a light weight material ½ inch thick was obtained which had a modulus of rupture of 1637, and increased only 12.4% in weight and 1.71% in thickness on a 24 hour immersion test.

EXAMPLE 5

Finely divided lignocellulose was thoroughly mixed with 3% by weight of dibasic ammonium phosphate and 6% of finely divided by-product lignin. The mixture was placed in a steel cylinder that had a continuous baffled port on the inner wall to which was connected a pressure line fitted with a pressure gauge and a valve. Gaskets were placed on both ends of the cylinder, and steel stops were placed on the top and bottom of the material so that it would be compressed below the depth of the cylinder when the device was placed in a hot press.

A number of experiments were conducted according to the method of this example. In one experiment the press was heated to 450° F., the press closed on the gaskets and the material was allowed to develop its own pressure as a result of the reaction. No external steam was introduced into the ring. The pressure was permitted to rise to 400 pounds per square inch where it was held substantially constant by venting the excess pressure. The cylinder took approximately 15 minutes to reach this pressure, and the material was held confined in the press for a total of 25 minutes. When the product was removed, it was found to be very dark, tough and uniform. It has a density of 50 pounds per cubic foot and a modulus of rupture of 2,425 pounds per square inch, which was quite high for a lignocellulose reaction product of that density.

To show the effect of even a small amount of pressure, two 20 minute runs were made as above, except that in the first run the cylinder was continuously vented so that no pressure was allowed to develop; while in the second the pressure rose to 100 pounds per square inch where it was maintained constant. The products obtained and their moduli of rupture were:

| Pressure | Density of Product, lb. per cu. ft. | Modulus of Rupture, lb. per sq. in. |
|---|---|---|
| 0 | 51.9 | 1,304 |
| 100 | 49.3 | 1,617 |
| 400 | 50.0 | 2,425 |

Thus, the beneficial effect of increased pressure is readily apparent, and the runs prove that an ordinary hot press fitted with gaskets can be used as an autoclave for the single stage production of materials. The introduction of steam at the start of the press cycle rather than depending on the material for development of pressure drastically reduces cycle time. In addition, control of the press process is greatly increased by control of vapor pressure which is impossible in an open press.

The following table sets forth experiments with moldable compositions prepared in an autoclave and molded products prepared from these compositions.

| Example No. | Composition | Autoclave | | Molding | | | Remarks—Nature of Product |
|---|---|---|---|---|---|---|---|
| | | °F. | Time, Mins. | Mins. | °F. | P. s. i. Pressure | |
| 6 | 10L-C+1S | 380 | 30 | 5 | 385 | 5,000 | Good. |
| 7 | 10L-C+1S | 405 | 10 | 5 | 275 | 5,000 | Do. |
| 8 | 10L-C+1S | 425 | 10 | 10 | 300 | 5,550 | Very Good. |
| 9 | 10L-C+1S | 425 | 10 | 20 | 350 | 5,550 | Do. |
| 10 | 10L-C+1S+5% CUSO₄ | 425 | 10 | 10 | 300 | 5,550 | Do. |
| 11 | 10L-C+1S | 425 | 20 | 10 | 300 | 5,550 | Do. |
| 12 | 10L-C+1S | 425 | 40 | 10 | 300 | 5,550 | Fair. |
| 13 | L-C | 425 | 20 | 10 | 300 | 5,550 | Do. |
| 14 | L-C | 425 | 10 | 10 | 300 | 5,550 | Good. |
| 15 | L-C+25PSIH₂S | 425 | 10 | 4 | 350 | 5,550 | Do. |
| 16 | L-C+25PSISO₂ | 425 | 10 | 10 | 300 | 5,550 | Very Good. |
| 17 | L-C+25PSISO₂ | 425 | 10 | 5 | 350 | 5,550 | Good. |
| 18 | L-C+25PSISO₂ | 425 | 10 | 3.5 | 350 | 5,550 | Do. |
| 19 | 10L-C+1S | 425 | 10 | 4 | 350 | 4,525 | Do. |
| 20 | L-C+10% NH₄OH | 425 | 10 | 10 | 450 | 5,550 | Fair. |
| 21 | 10L-C+1S | 425 | 10 | 4 | 335 | 4,000 | Good. |
| 22 | 10L-C+1S | 425 | 10 | 4 | 365 | 4,000 | Do. |
| 23 | 10L-C+1S | 425 | 10 | 4 | 390 | 4,000 | Do. |
| 24 | 10L-C+1S+10% NH₄OH | 425 | 20 | 4 | 370 | 4,000 | Do. |
| 25 | 10L-C+1S+10% NH₄OH | 425 | 20 | 7 | 365 | 5,550 | Do. |
| 26 | 10L-C+1S+10% NH₄OH | 425 | 20 | 8 | 390 | 5,550 | Do. |
| 27 | 10L-C+1S | 425 | 10 | 2 | 360 | 4,000 | Do. |
| 28 | 10L-C+1S+10% NH₄OH | 425 | 20 | 4 | 360 | 4,000 | Do. |
| 29 | L-C | 425 | 30 | 4.5 | 370 | 400 | Do. |

In the above table L–C indicates lignocellulose while S indicates sulfur. The amounts given are parts by weight except where otherwise indicated. In these other instances, these amounts are percentages by weight of lignocellulose. In general, the methods of the above examples are substantially the same as those given above in Example 1. In each of Examples 6–29 the reaction took place in the presence of unsaturated steam at about 300 pounds per square inch gauge.

EXAMPLE 30

Material mixed and autoclaved as in Example 3 was further blended with 5% hexamethylene tetramine, 5% magnesium oxide, and 1% magnesium stearate for 30 minutes in a ball mill. To a portion of the blend was added 20%, based on the lignocellulose content, of a 50% mixture of furfural and phenol and 10% of a 65% solution of dimethylolurea. The compound was thoroughly mixed and aged for several weeks. Similarly, to a blend of the autoclaved material, hexamethylene tetramine, magnesium oxide, and magnesium stearate was added 20% by weight of furfural and 13% of a mixture containing 15% of ammonium hydroxide and 30% of dimethylolurea. The two molding compounds were then molded in a disc mold at a temperature of 310° F. and under a pressure of 5,000 pounds per square inch. The compound containing phenol was molded for 6 minutes while that with only furfural was molded for 3 minutes. Both moldings were hard, black and shiny, and appeared very strong. On 24 hour water immersion they gave the following results:

| Plasticizer | Molding | | P. s. i. Pressure | Percent Water Absorbed—24 hrs. |
|---|---|---|---|---|
| | Time, mins. | Temp., °F. | | |
| Furfural | 3 | 310 | 5,000 | 1.14 |
| Furfural and Phenol | 6 | 310 | 5,000 | 1.00 |

Both of these materials exhibited good flow when molded in a standard A. S. T. M. cup mold. Many other successful molding compounds have been made utilizing the prior mentioned groups of plasticizers and copolymers, and many variations in percent can be utilized depending upon the desired results. However, these two compositions illustrate how the basic autoclave material can be compounded with other materials.

In the methods of this invention the high pressure reaction may be used to treat the lignocellulose prior to molding but may also be used to chemically treat the lignocellulose without molding as the treated material itself has other uses such as employment as fillers in various plastic compositions. The method may also be used to produce products of a wide range of densities wherein the high pressure reaction and shaping is carried on at the same time.

Where the reaction takes place in an atmosphere of steam the volatile content of the resulting product may be reduced by using superheated steam. There is, of course, very little condensation with superheated steam.

The following table shows the reduction obtained in the volatile content of the product by operating with superheated steam:

Autoclave

| Run No. | Time, Mins. | Temp., °F. | Pressure, p. s. i. | Percent Volatile Content |
|---|---|---|---|---|
| A | 10 | 419 | 323 | 14.5 |
| B | 10 | 425 | 300 | 5.89 |
| C | 20 | 438 | 256 | 1.3 |
| D | 30 | 417 | 330 | 58.3 |
| E | 30 | 425 | 300 | 5.78 |

All of the above runs were made with plain lignocellulose, but are typical of the results in general.

It was also found that when the reaction temperature is increased, the reaction time was considerably decreased. Thus, where ground lignocellulose was used with steam at 300 pounds per square inch and about 425–450° F. temperature as a reactant the reaction time was found to be 20 minutes at this 300 pounds per square inch pressure. When the pressure was increased to 400 pounds per square inch, the reaction time was only about 7 minutes. Where the steam pressure was increased to 500 pounds per square inch, the reaction time was reduced to between 4–5 minutes. These steam pressures were all gauge pressures.

The reaction temperatures and times are controlled as desired to produce flow or moldability in the autoclave product and strength and stability in the final product. Thus, where the product is to be used as a molding material, it was discovered that under the above conditions with plain lignocellulose a reaction time of less than 20 minutes resulted in poor flow. But at this same steam pressure and using the same lignocellulose a reaction time of over 30 minutes produced a high quality moldable product. Apparently steam breaks down the lignocellulose so that the lignin acts as a binder while some of the hydrolized products of the reaction operate as plasticizers. In the high pressure confined atmosphere method of this invention, these reaction products are primarily retained. In the prior processes where a hydrolizing reaction was carried out either in the atmosphere or in a slurry, many of the by-products either passed off as gases or were dissolved and removed in the liquid. Thus by avoiding excess water the process of this invention results in the saving of substantial portions of the hemi-celluloses and makes them available for use as plasticizers. However, if the reaction is carried on too long a time at too high a temperature, the hemi-celluloses and other hydrolized products of the reaction tend to polymerize so that the final product exhibits lack of flow and is difficult to mold. The nature of these polymerizates is not completely understood.

Thus one of the advantages of the process of this invention is that it reduces losses of the lignocellulose and, furthermore, permits the use of lower molding pressures and temperatures when the reaction product is used as a molding composition.

In general, the above facts are true when other reactants are used. Thus when the reactant is the preferred sulfur, the steam pressure used is preferably between 300–600 pounds per square inch in the reactor. Pressures as low as 200 pounds can be used but below this the reaction tends to proceed very slowly. Pressures to 1,000 pounds can be used, but they tend to be uneconomic at these high values. Here again these remarks also apply to the other reactants disclosed herein.

When ammonium hydroxide is used with sulfur as the reactant the losses from the reaction are somewhat less than when sulfur only is used. Although the reason for this is not known, it appears that the ammonium hydroxide neutralizes the acid formed and, therefore, removes the acid which normally catalyzes the degradation of the lignocellulose. Alkalis function in a similar manner, although ammonium hydroxide is preferred as in general alkalis stronger than the alkaline earths, unless present in small amounts, on the order of 1%, tend to promote excessive degradation.

Having described my invention as related to the embodiments set out herein, it is my intention that the invention be not limited by any of the details of description unless otherwise specified, but rather be construed broadly within its spirit and scope as set out in the accompanying claims.

I claim:

1. The method of making a moldable and extrudable composition in a substantially dry process, consisting essentially of: reacting finely-divided essentially dry lignocellulose in the absence of substantial amounts of added water and from about 0.5–20% of sulfur in the presence of steam at a temperature of about 300–550° F. in a confined atmosphere at a temperature of from about 300–550° F. at a gauge pressure of at least about 200 pounds per square inch for from about 4–60 minutes, all said percentages being by weight of said lignocellulose.

2. The method of making a moldable and extrudable composition in a substantially dry process, consisting essentially of: reacting finely-divided essentially dry lignocellulose in the absence of substantial amounts of added water and from about 0.5–20% of sulfur and from about 2.5–10% of ammonium hydroxide in the presence of steam at a temperature of about 300–550° F. in a confined atmosphere at a temperature of from about 300–550° F. at a gauge pressure of at least about 200 pounds per square inch for from about 4–60 minutes, all said percentages being by weight of said lignocellulose.

3. The method of making a moldable and extrudable composition in a substantially dry process, consisting essentially of: reacting finely-divided essentially dry lignocellulose in the absence of substantial amounts of added water and from about 0.5–20% of sulfur and from about 2.5–10% of ammonium hydroxide and about 0.5–10% of formaldehyde in the presence of steam at a temperature of about 300–550° F. in a confined atmosphere at a temperature of from about 300–550° F. at a gauge pressure of at least about 200 pounds per square inch for from about 4–60 minutes, all said percentages being by weight of said lignocellulose.

4. The method of making a moldable and extrudable composition in a substantially dry process, consisting essentially of: reacting finely-divided essentially dry lignocellulose in the absence of substantial amounts of added water and from about 0.5–20% of sulfur and sulfur dioxide in the presence of steam at a temperature of about 300–550° F. in a confined atmosphere at a temperature of from about 300–550° F. at a gauge pressure of at least about 200 pounds per square inch for from about 4–60 minutes, all said percentages being by weight of said lignocellulose.

5. The method of making a moldable and extrudable composition in a substantially dry process, consisting essentially of: reacting finely-divided essentially dry lignocellulose in the absence of substantial amounts of added water and from about 0.5–20% of sulfur and about 2.5–10% of lime in the presence of steam at a temperature of about 300–550° F. in a confined atmosphere at a temperature of from about 300–550° F. at a gauge pressure of at least about 200 pounds per square inch for from about 4–60 minutes, all said percentages being by weight of said lignocellulose.

6. The method of making a moldable and extrudable composition in a substantially dry process, consisting essentially of: reacting finely-divided essentially dry lignocellulose in the absence of substantial amounts of added water and from about 0.5–20% of sulfur and from about 2–20% of furfural in the presence of steam at a temperature of about 300–550° F. in a confined atmosphere at a temperature of from about 300–550° F. at a gauge pressure of at least about 200 pounds per square inch for from about 4–60 minutes, all said percentages being by weight of said lignocellulose.

7. The method of making a moldable and extrudable composition in a substantially dry process, consisting essentially of: reacting finely-divided essentially dry lignocellulose in the absence of substantial amounts of added water and from about 0.5–20% of sulfur and from about 2–20% of aniline in the presence of steam at a temperature of about 300–550° F. in a confined atmosphere at a temperature of from about 300–550° F. at a gauge pressure of at least about 200 pounds per square inch for from about 4–60 minutes, all said percentages being by weight of said lignocellulose.

8. The method of making a moldable and extrudable composition in a substantially dry process, consisting essentially of: reacting finely-divided essentially dry lignocellulose in the absence of substantial amounts of added water and from about 0.5–20% of sulfur and from about 2–20% of phenol in the presence of steam at a temperature of about 300–550° F. in a confined atmosphere at a temperature of from about 300–550° F. at a gauge pressure of at least about 200 pounds per square inch for from about 4–60 minutes, all said percentages being by weight of said lignocellulose.

9. A moldable and extrudable composition prepared by the method of claim 1.

10. A moldable and extrudable composition prepared by the method of claim 2.

11. A moldable and extrudable composition prepared by the method of claim 3.

12. A moldable and extrudable composition prepared by the method of claim 4.

13. A moldable and extrudable composition prepared by the method of claim 5.

References Cited in the file of this patent

UNITED STATES PATENTS 1,612,098    Christmas _____ Dec. 28, 1926

(Other references on following page)

UNITED STATES PATENTS

| | | | |
|---|---|---|---|
| 1,802,715 | Hixon et al. | Apr. 28, | 1931 |
| 1,832,807 | Ellis | Nov. 17, | 1931 |
| 1,892,409 | Prentiss | Dec. 27, | 1932 |
| 1,923,756 | Sherrard et al. | Aug. 22, | 1933 |
| 2,033,411 | Carson | Mar. 10, | 1936 |
| 2,041,120 | Ellis | May 19, | 1936 |
| 2,247,207 | Schorger | June 24, | 1941 |
| 2,303,345 | Mason et al. | Dec. 1, | 1942 |
| 2,486,601 | Irwin | Nov. 1, | 1949 |
| 2,490,078 | Meiler | Dec. 6, | 1949 |
| 2,552,597 | Smith | May 15, | 1951 |
| 2,553,412 | Heritage | May 15, | 1951 |
| 2,692,206 | Othmer et al. | Oct. 19, | 1954 |
| 2,706,160 | Glab | Apr. 22, | 1955 |
| 2,708,637 | Glab | May 17, | 1955 |

FOREIGN PATENTS

| | | | |
|---|---|---|---|
| 17,299 | Great Britain | June 11, | 1902 |
| 463,894 | Canada | Mar. 21, | 1950 |
| 657,812 | Great Britain | Sept. 26, | 1951 |

OTHER REFERENCES

Lange: Handbook of Chemistry, ninth edition, page 1468 (1956).